United States Patent [19]

Dick

[11] Patent Number: 4,782,721
[45] Date of Patent: Nov. 8, 1988

[54] VEHICLE GEAR ASSEMBLY FOR TORQUE TRANSFER TO TWO OR FOUR WHEELS

[75] Inventor: Wesley M. Dick, Sylvania, Ohio
[73] Assignee: Dana Corporation, Toledo, Ohio
[21] Appl. No.: 913,332
[22] Filed: Sep. 29, 1986

Related U.S. Application Data

[63] Continuation-in-part of Ser. No. 708,737, Mar. 6, 1985, abandoned.

[51] Int. Cl.[4] .............................................. F16H 37/06
[52] U.S. Cl. .................. 74/665 GA; 180/247
[58] Field of Search ... 74/665 GA, 665 GC, 665 GR; 192/53 G, 53 B; 180/247, 248, 249, 250

[56] References Cited

U.S. PATENT DOCUMENTS

| | | | |
|---|---|---|---|
| 2,802,554 | 8/1957 | Pringle | 74/665 GA |
| 2,853,890 | 9/1958 | Kelbel | 74/665 GA |
| 3,003,607 | 10/1961 | Magg | 192/53 F |
| 4,270,409 | 6/1981 | Glaze et al. | 74/665 GA |
| 4,344,335 | 8/1982 | Kawai | 74/674 |
| 4,553,623 | 11/1985 | Ohkubo et al. | 74/700 |
| 4,559,846 | 12/1985 | Cochran et al. | 74/665 GA |
| 4,566,569 | 1/1986 | Eriksson | 192/53 G |
| 4,586,592 | 5/1986 | Mori | 180/247 |
| 4,685,352 | 8/1987 | Ohkubo | 74/665 GA |

*Primary Examiner*—Lawrence Staab
*Assistant Examiner*—Scott Anchell
*Attorney, Agent, or Firm*—Charles F. Schroeder

[57] ABSTRACT

A gear assembly for selectively shifting the driving torque in an engine driven vehicle to either a 2 or 4-wheel high mode while in motion, or from a neutral position to a 4-wheel low mode and return. The assembly has five main gears including an input set of two and an output set of three constant mesh gears rotatably mounted in fixed positions and a synchronizer in between the two sets in selective driving association with the output gear set. Selective transfer of torque from the input drive to the assembly to either or both the front and rear output shafts is effected by operation of a single shift rod which in turn moves a single fork both for activation of the synchronizer and for shifting the assembly into its 2 and 4-wheel high, neutral and 4-wheel low drive positions through interconnecting gear clutch collars. In one embodiment a pair of coaxial collars are incorporated in the gear assembly. In a second embodiment which reduces need for concern for windup stress, three such collars are utilized, one being coaxial with two side-by-side slideable collars internal thereof. A poppet member arrangement in the form of poppet balls or slugs provide an interlocking connection between clutch collars for their positive positioning in the drive positions manually selected by way of the shift rod.

14 Claims, 7 Drawing Sheets

VEHICLE GEAR ASSEMBLY FOR TORQUE TRANSFER TO TWO OR FOUR WHEELS

BACKGROUND OF THE INVENTION

This is a continuation in part of my application Ser. No. 708,737 filed on Mar. 6, 1985, now abandoned.

This invention is a gear system which enables transfer of engine supplied drive power to and between two and four-wheel high speed drive modes while the vehicle is in motion as well as allowing independent shifting of power to a 4-wheel low speed drive mode from a stopped neutral position.

Four-wheel drive vehicles are highly desirable for off-road travel over rough terrain because of their greater reliability in providing traction in such conditions, but on the usual hard improved surface roads they can be more economicaly operated as a two-wheel conventional drive vehicle. The capability of shifting of a four-wheel drive vehicle to two-wheel driving and return therefore is highly desirable dependent on the conditions of traction confronted.

Gear transfer arrangements of the prior art have enabled conversion of vehicles to two-wheel or four-wheel drive modes, but in many arrangements the shifting between such modes has not been possible while the vehicle is in motion. In one such arrangement the position of the locking drive hub of the usual non-driven wheels must be manually locked or unlocked to correspond to the four or two-wheel drive shift control positions desired. Thus conversion from two-wheel to four-wheel drive and return has been cumbersome, time consuming and subject to error in combinations of settings required to obtain the wheel driving relationships desired.

In another type of prior art gear shift system, a belt drive arrangement is relied upon in which a chain belt is utilized to supply power to the gear system. The efficiency of this system suffers from greater power consumption in that all gears of the assembly operate all the time with corresponding constant splashing through oil without relief in shifting from one drive mode to another. In addition, the chain belt drive calls for a greater amount of space in comparison to a corresponding gear assembly.

Other all gear systems exist which include constant mesh gear arrangements but lack the simple reliable fixed relation of gears of the present invention in addition to lacking means for synchronizing gear speeds for a smooth shift between two and four-wheel drive modes while the vehicle is in motion or between two and four-wheel and a single fork means effecting shifts between operating modes.

In view of the foregoing, it is an object of the present invention to provide an improved torque transfer system in the form of a gear assembly unit incorporating a synchronizer for matching gear speeds to permit shifting of torque from a two to a four-wheel drive mode and return while the vehicle is in motion and in which only a single actuating fork is required to change operating modes.

Another object of the invention is to provide an improved rugged and long life torque transfer unit in which reliability is promoted by having all the gears rotatable in an axially fixed position in constant mesh relationship and in which torque transfers through the system can be effected by the movement of a single shift fork.

SUMMARY OF THE INVENTION

The invention is an improved vehicle torque transfer gear mechanism in which the gear assembly includes an input set of two constantly meshed gears in side by side spaced relation with an output set of three constantly meshed gears and a gear speed synchronizer between the two gear sets associated with the output set to match speeds of the two gear sets to enable a smooth shifting of torque paths between two and four-wheel high drive modes while the vehicle is in motion. Clutching collars all movable by a single shift fork effect the changes in drive modes selected by way of a shift control rod. The four-wheel low speed drive mode is set by shifting from a stop/neutral position. A novel concentric arrangement of clutching collars with interlocking slug means in the form of poppet balls or palls provide a space saving means for shifting torque paths. In addition the annular synchronizer in applicant's arrangement is positively piloted by support about the opposite peripheral edges thereby assuring more square and positive alignment and support of the synchronizer against wobble for reliable operation.

A feature of the invention is that power transfer is effected through an all gear assembly in which only two gears operate in the two-wheel drive mode while all five gears are called into operation only in the lesser used four-wheel drive mode thus promoting high efficiency in over all operation of the power transfer unit.

Still another feature of the invention is that only a single fork is required for shift of torque transfer collars and for activation of the synchronizer to effect shifts of torque paths through the gear assembly.

FIRST EMBODIMENT

Figure 1:
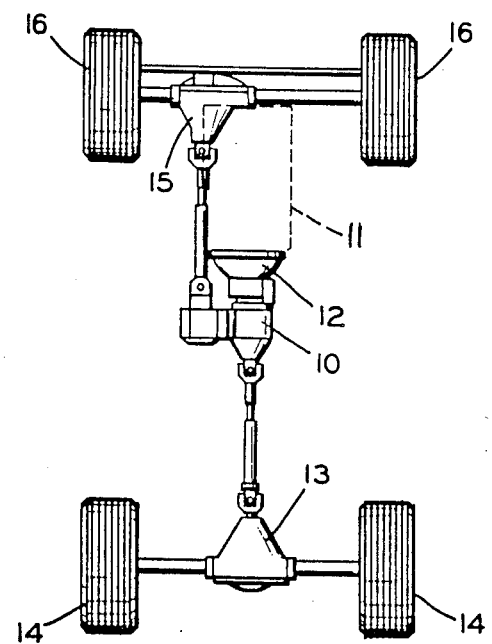
FIG. 1 is a partially schematic plan view of components of a four-wheel drive system for an automotive vehicle including a gear transfer unit of the present invention.

Referring to the drawings in greater detail, FIG. 1 shows the case 10 for the torque transfer mechanism of the present invention positioned in a four-wheel vehicle behind the engine 11 and its transmission 12 which has a tail shaft (not shown) to which the unit 10. is connected for receipt of engine driving power. Power is transmitted from the unit 10 to the rear wheels 14 through a rear differential 13 and power supplied to the front wheels 16 is supplied through a front wheel differential 15.

Figure 2:
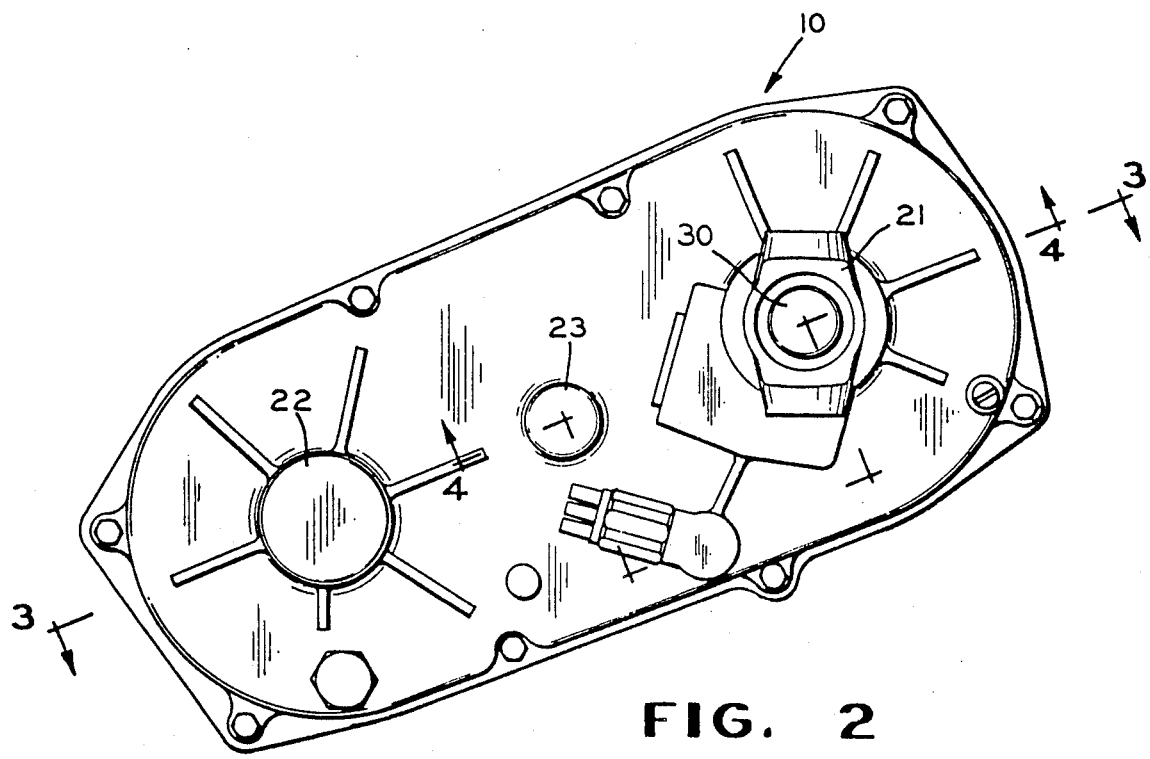
FIG. 2 is an enlarged and elevational view of the rear output end of the case for the four-wheel gear transfer unit of FIG. 1.

FIG. 2 shows the rear output end of the gear case 10 with its rear drive shaft portion 21 including the rear output shaft 30, closed front drive shaft portion 22 and the closed intermediate shaft portion 23.

Figure 3:
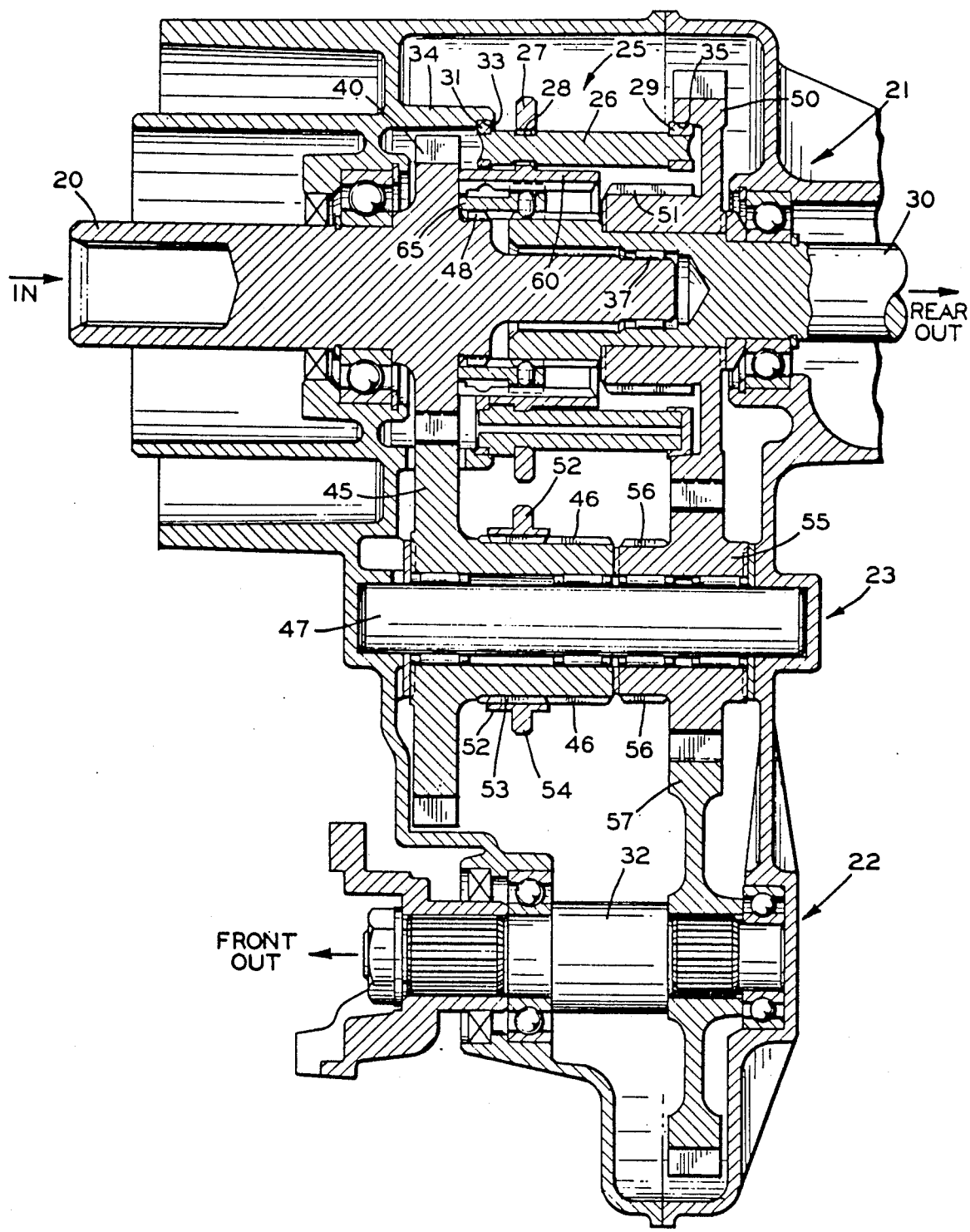
FIG. 3 is a cross-sectional view of the transfer case of FIG. 2 as taken on line 3—3 showing the five gear assembly with the synchronizer located between the input and output gear sets.

FIG. 3 is a cross-sectional view of the case 10 as taken on line 3—3 of FIG. 2 showing the input drive shaft 20 and the associated gear assembly for driving the rear wheel and front wheel output shafts 30 and 32, respectively. The input drive shaft 20 is axially aligned with the rear output shaft 30, each shaft being rotatable independent of the other, but interassociated by providing the input shaft 20 with a reduced diameter end portion extending coaxially into a hollowed end portion of the rear output shaft 30. A small gap 36 between the mated coaxial ends of the shafts provides a space for a needle bearing 37 to provide mutual support for the two shafts 20 and 30.

Two sets of constant mesh gears make up the torque transfer gear assembly, namely an input gear set and an output gear set. The input gear set includes an input gear 40 in constant mesh with a larger diameter low speed gear 45. The input gear is fixed on the input shaft 20 and can be formed integrally with the input shaft as shown to provide a solid constantly aligned combination. The low speed gear 45 is rotatably mounted on roller bearings on an intermediate shaft 47.

The output gear set includes a rear drive gear 50 in constant mesh relation with a smaller intermediate gear 55 which in turn is in constant mesh with the front output gear 57 which is of the same size as the rear drive gear 50. The rear drive gear 50 is supported rotationally on the rear output shaft 30 while the intermediate gear 55 is rotatably mounted on roller bearings on the intermediate shaft 47 and the front drive gear is fixed in splined relation on a ball bearing supported front output shaft 32.

The drive power paths through the gear assembly are changed by laterally shifting of splined collars on and between splines 48 and 68 at the confronting exterior ends of the input and rear output shafts 20 and 30, respectively, splines 51 of a hub of the rear drive gear 50 and confronting hubs of the intermediate gear 55 and low speed gear 45 on the intermediate shaft 47.

TWO-WHEEL HIGH MODE

Figure 5:
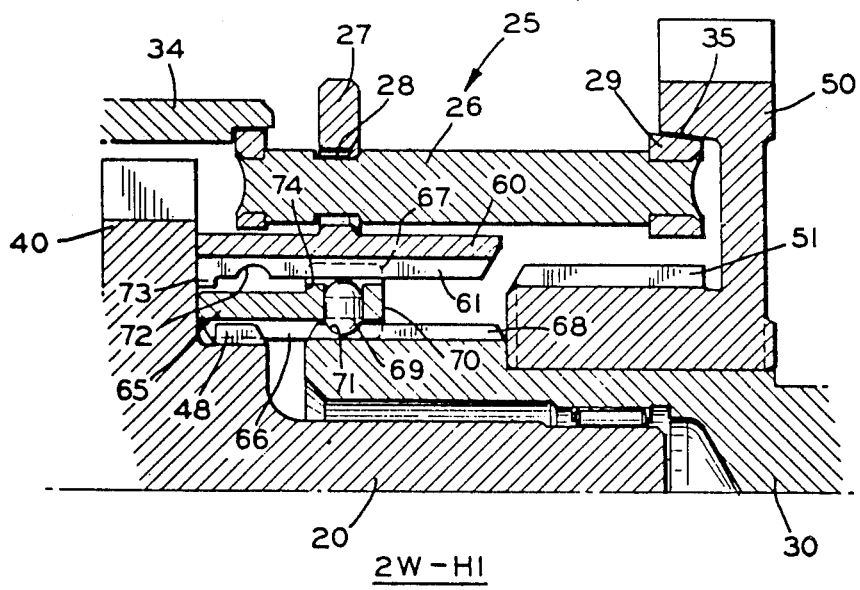
FIG. 5 is an enlarged somewhat schematic view of a portion of the gear assembly of FIG. 3 showing the clutch collar position and the synchronizer setting to provide a two-wheel high speed drive mode for the vehicle.
Figure 6:
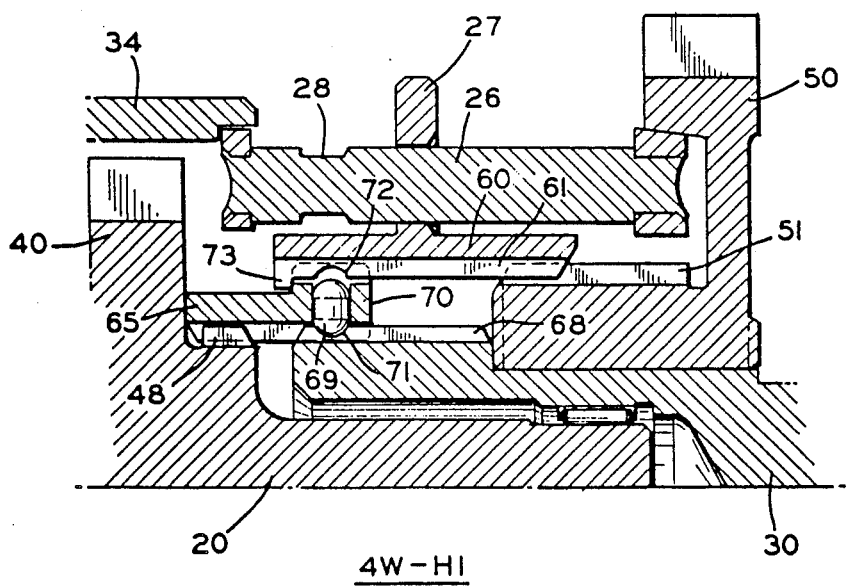
FIG. 6 is a view of part of the gear assembly of FIG. 3 showing the shift collar and synchronizer settings for a four-wheel high drive mode of the vehicle.

FIGS. 5 and 6 show a coaxial collar assembly in which internal splines 61 of an annular outer collar 60 make slidable driving engagement with external teeth 67 of a smaller annular interior collar 65. The interior collar 65 has internal splines 66 which in the high speed two-wheel drive mode of the assembly bridges the gap between the confronting ends of the input and rear output shafts 20 and 30 and engages matching peripheral splines 48 and 68 about the ends of shafts 20 and 30, respectively. A series of elongated cylindrical locking slugs 69 with hemispherical ends, herein alternatively termed palls 69, are each snugly fit within one of a series of apertures in a thicker extra strength marginal edge 70 provided on the inner collar 65. The collar edge 70 as shown extends over the end portions of splines 68 on shaft 30 where the ends of the palls 69 make engagement with matching locking recesses 71 in the splines 68. The palls 69 are sufficiently long to be backed by the splines of the outer collar 60 thereby causing the palls to positively lock the collar 65 in its bridging relation in the two wheel drive mode until the collar 60 is slid laterally as described hereinafter, where an opposite series of pall matching recesses 72 in the interior splines 61 of the outer collar 60 receive the opposite ends of the palls to release the palls and the collar 65 from their locked two-wheel drive position.

A pin type synchronizer 25 is mated in selective driving relation with the rear output drive gear 50 and has its locking ring 27 joined integrally with the outer circumferential periphery of the collar 60 so that upon movement of collar 60, the synchronizer is activated to establish a driving relation with the rear drive gear 50. The synchronizer includes a cone shaped clutching ring 29 which selectively makes a locked driving communication or a disengaged non-driving relation with a finished internal rim 35 of the rear drive gear 50. The synchronizer in the two-wheel high mode represented in FIG. 5 is illustrated in its disengaged relation. A set of synchronizer blocking pins 26 extend between the clutching ring 29 and an opposite retaining ring 31 and in doing so, pass through separate retaining apertures in the locking ring 27. The blocking pins 26 each have a circumferential groove 28 which when the synchronizer is inactive, is located in the region of the aperture in the locking ring 27 through which it passes, thus resulting in the pins 26 being held in a released condition within the locking ring 27. The retaining ring 31 in the present invention is piloted by a residence backing groove 33 in a stationary portion of the case for the transfer mechanism 10, which as shown is in the form of a projecting portion 34. Thus the synchronizer can be stably retained against possible wobble within the assembly and maintained in dimensionally square association with the rear drive gear 50.

When the synchronizer locking ring 27 is moved laterally for selection of a next drive mode, which from the two-wheel drive arrangement represented in FIGS. 3 and 5 would be the four-wheel high drive mode of FIG. 6, the ring 27 passes over the shoulders of the blocking pin grooves 28 and causes the pins to take on positions which results in the cone shaped clutching ring 29 engaging the rear drive gear rim surface 35 in driving relation.

Figure 4:
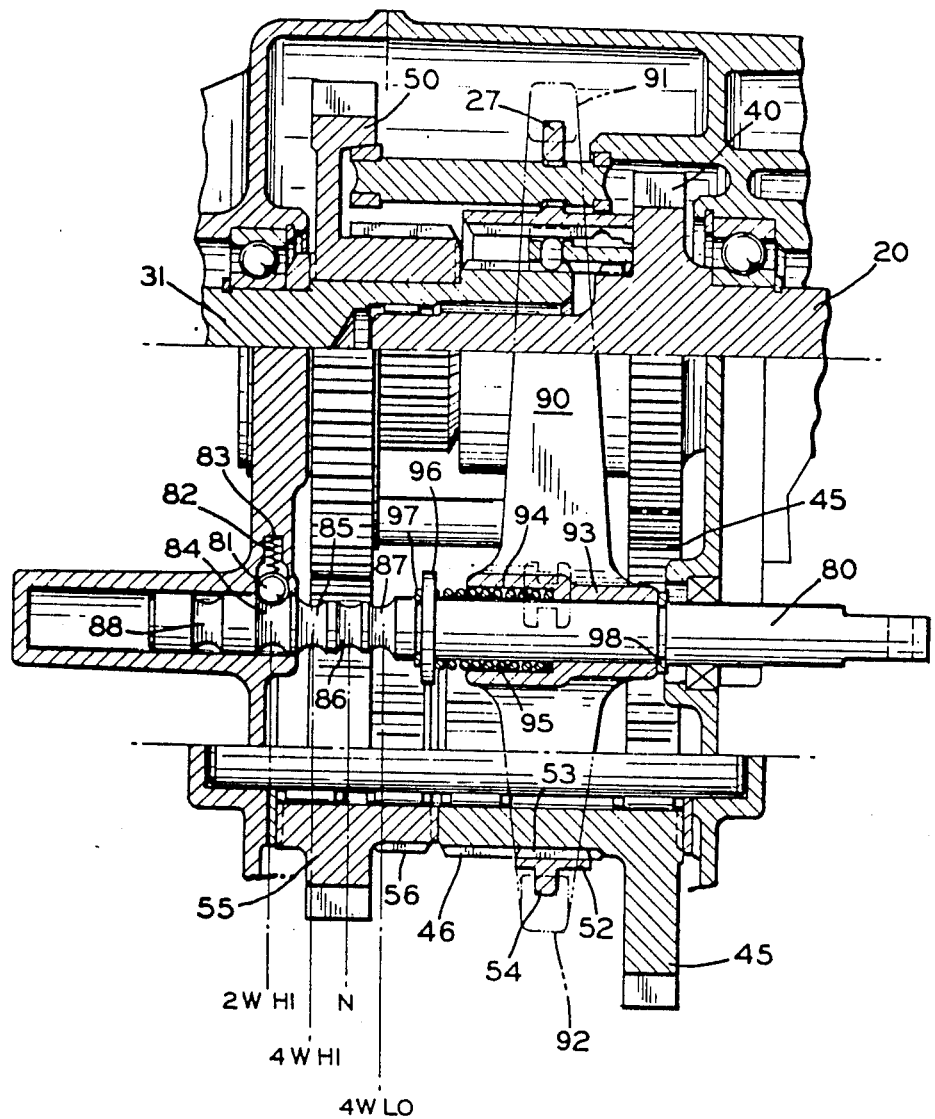
FIG. 4 is a cross-sectional view of the transfer case shown in FIG. 2 showing the gear assembly as viewed on line 4—4 illustrating the shift rod and shift fork for engagement with clutch collars to effect changes in drive modes of the vehicle.

The mechanism for effecting a change of drive mode by way of a single manually operated control rod (not shown) is illustrated in FIG. 4 which is a cross-sectional view of the torque transfer unit as taken on line 4—4 of FIG. 2. A shift rod 80 connected to and moved by the manually operated control rod has a shift fork 90 mounted thereon in close fit sliding relation by way of a fork hub 93 which is backed by a retaining ring 98 fixed on shaft 80. An upper arm 91 of the shift fork makes engagement with the rotatable synchronizer locking ring 27 which in turn is directly connected to the outer shift collar 60 so that upon lateral movement of the fork 90 both the locking ring and the collar 60 are correspondingly laterally moved. An oppositely extending lower arm 92 of the fork similarly engages a low speed rotatable collar 52 to permit lateral movement thereof by way of an exterior detent 54 projecting therefrom. The collar 52 has internal splines 53 which communicate in sliding relation with mating splines 46 and 56 on the hubs of gears 45 and 55, respectively, both rotatably mounted in side-by-side relation on the intermediate shaft 47.

The hub 93 of fork 90 has a hollow cup-like opening 95 for accomodation of a biasing spring 94 surrounding the shaft 80 and extending outwardly from the hollow hub portion 95 for spring pressure relation against an annular spring retainer washer 96 mounted on the shaft 80 and backed by a retaining ring 97 fixed on the shaft. The pressure of the spring 94 against the washer 96 biases the fork hub 93 toward and against another retaining ring 98 also fixed on the shaft 80.

The shaft 80 has a series of side-by-side circumferential mode position grooves 84, 85, 86 and 87 for positioning of the shift rod 80 in semi-locked pressure relation for the two-wheel high, four-wheel high, neutral and four-wheel low speed drive modes, respectively. An extra groove 88 is provided for association with switching means for activation or signalling of auxiliary components if desired. At least one poppet ball 81 makes pressure engagement with the matching rounded grooves each in turn under the biased influence of a spring 82 which communicates with the ball within a residence opening 83 for the spring and ball in the case for unit. When the shaft 80 is moved longitudinally the pressure of the poppet ball 81 communicating with each respective groove is overcome to effect a shift in mode. When the shift rod 80 is moved to a position corresponding to the four-wheel high drive where the poppet ball pressure is exerted in groove 84, the pressure of the spring 82 is overcome and the ball 81 passes over the ridge of groove 84 and drops into groove 85 to lock the fork 90 in this position.

FIGS. 5 to 8 illustrate in sequence the power paths through the effective components of the gear assembly for the two-wheel high, the four-wheel high, neutral and four-wheel low modes, respectively. The synchronizer 25 in the two-wheel high mode, as described above, is in inactive condition represented in FIG. 5 while the input drive shaft 20 is connected directly to the rear output shaft 30 by the inner collar 65, the interior splines 66 of which establish a locked interengaging driving relation between splines 48 of the input shaft and splines 68 of the output shaft 30.

FOUR-WHEEL HIGH MODE

Upon shift of the rod 80 from its two-wheel high drive mode to the four-wheel high mode represented in FIG. 6, the poppet ball 81 is biased into the groove 85 to hold the shift rod 80 in position. The synchronizer locking ring 27 and the integrally associated external collar 60 of the coaxial collar assembly are thereby moved laterally toward the rear drive gear 50. In sequence, the synchronizer 25 is first activated by movement of its locking ring 27 over a portion of each of the blocking pins 26 from the grooves 28 which brings the clutch ring 29 into frictional driving engagement with the rim 35 of the rear drive gear 50. The gear 50 is thereupon gradually brought up to the rotational speed of the interconnected input and rear output shafts 20 and 30, respectively, whereupon the collar 60 and its splines 61 mate and slide into positive driving relation with the splines 51 of gear 50. The rear drive shaft 30 and the constant mesh output gear set including rear drive gear 50, intermediate gear 55, the front drive gear 57 and the front drive shaft on which it is fixed are thus all driven in unison in the four-wheel high speed mode by the input drive shaft 20. As indicated a feature of this arrangement is that shifting from two-wheel drive to four-wheel drive can be accomplished while the vehicle is in motion.

NEUTRAL MODE

Figure 7:
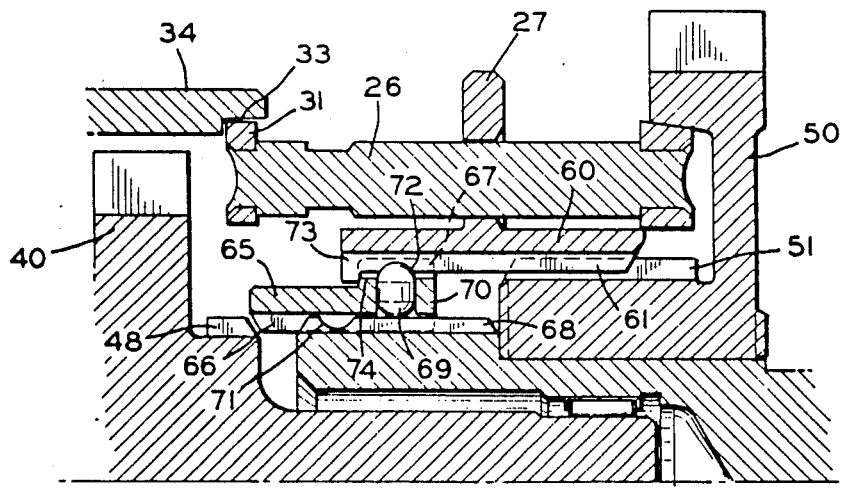
FIG. 7 is a view of part of the gear assembly of FIG. 3 showing the shift collar and synchronizer settings for the neutral mode of the vehicle.

When the shift rod 80 is moved to the neutral mode represented in FIG. 7, the fork 90 moves the synchronizer locking ring 27 and collar 60 still another step closer to the output gear 50 over its splines 51. This movement causes a radial inward thicker marginal projecting portion 73 of the collar 60 to engage the matching radial outward projection 74 at the marginal edge 70 of collar 65 and to draw the collar with it away from engagement with splines 48 of the input shaft 20. As may be seen in FIG. 6, the repositioning of the collar 65 from its locked condition of the two-wheel high mode releases the locking pall 69 because of the presence of a pall recess 72 in splines 61 which allows the locking pall 69 to be accepted in recess 72 from the locking recess 71. This in turn interlocks the exterior and interior collars 60 and 65 in an extended relation as illustrated in FIG. 7 with the collar 65 withdrawn from its driven communication with the splines 48 of the input shaft 20. The output gear set is thus placed in an idle neutral condition with neither the rear or front output shafts 30 and 32 connected for receipt of power.

FOUR-WHEEL LOW MODE

Figure 8:
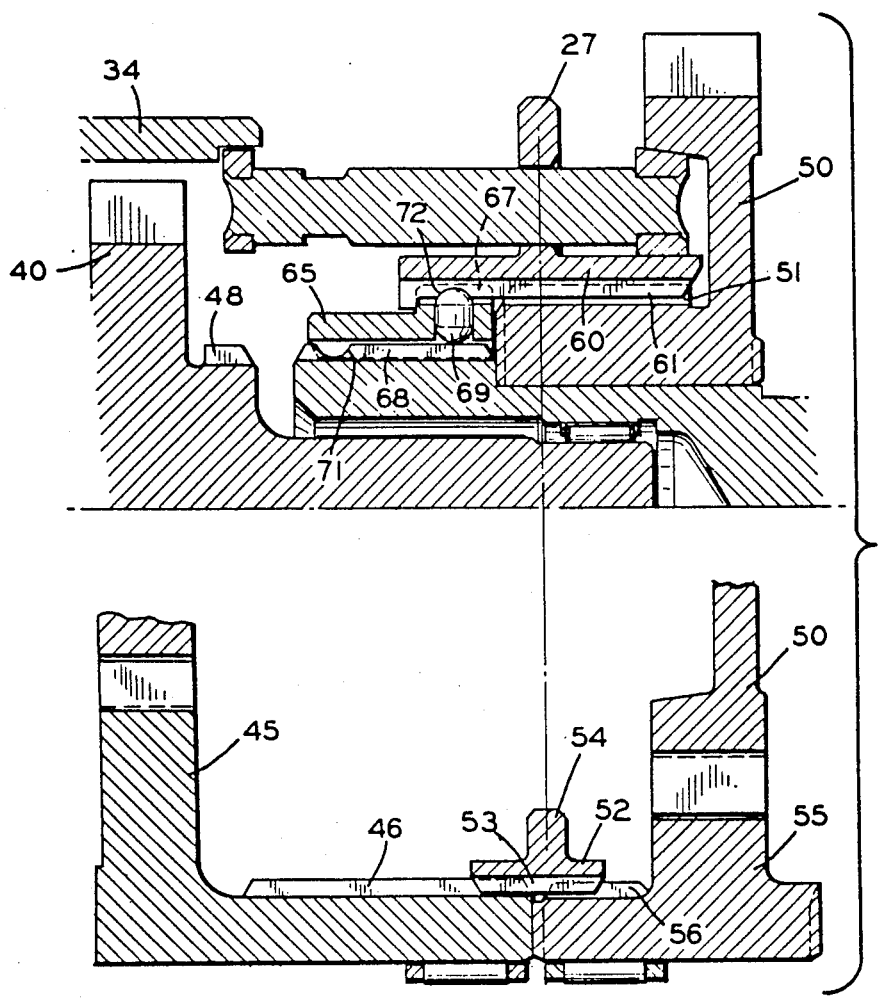
FIG. 8 is a view of part of the gear assembly of FIG. 3 showing the shift clutch collar and synchronizer settings for a four-wheel low drive mode of the vehicle.

Upon movement of the shift rod 80 from the neutral position to the four-wheel low drive mode represented in FIG. 8, the interlocked extended collars 60 and 65 are advanced still further toward the rear output gear 50 while maintaining their intermeshed relation with the splines 61 and 68 and correspondingly maintaining an interlocked relation of the output gear 50 with the rear output shaft 30. At the same time the low speed collar 52 is moved into position to bridge splines 46 and 56 of the low speed gear 45 and intermediate gear 55, respectively, thereby resulting in these two gears rotating in unison. The torque of the input shaft 20 thus is transmitted from the input gear 40 to the low speed and intermediate gears 45 and 55, respectively, from which it is transmitted to both the rear and front output gears 50 and 57, respectively, shown more clearly in FIG. 3, and correspondingly the rear and front output shafts 30 and 32 to which they are connected. Thus the four wheels of the vehicle are supplied with torque power at the same rotational speed since both the rear drive gear 50 and front drive gear 57 are of the same size and are both driven by the smaller intermediate gear 55 which in turn is driven by the larger low speed gear 45, consequently providing a higher torque and lower speed power to the output shafts in comparison to the power supplied to the input shaft 20.

SHIFT UNDER WINDUP STRESS

As the shift rod 80 is moved into position from the two-wheel high mode illustrated in FIGS. 3, 4 and 5 to the four-wheel high, neutral and four-wheel low modes of FIGS. 6, 7 and 8, respectively, the retaining ring 98 pushes the hub 93 of the fork 90 laterally to activate the synchronizer and position clutch collars for the corresponding operating modes without significant restraint upon movement of the shift rod 80. In reverse sequence, however, the assembly at times has transient internal stresses of drive wheel windup developed therein, such as by reason of vehicle turns which result in greater travel of the front wheels relative to the rear wheels, which cause a restraint in movement of collars for shifts from four-wheel drive modes. More specifically, upon motion of the shift rod 80 from the four-wheel high mode of FIG. 6 to the two-wheel high mode of FIG. 5, stresses can arise between splines 51 and 61 of the rear output gear 50 and the collar 60, respectively, such that the collar 60 is restrained from lateral movement to effect its disengagement from gear 50 for shift into the two-wheel high mode illustrated in FIG. 5. The shift rod 80 in being moved under such assembly stressed conditions slides within the fork hub 93 causing the retaining washer 96 to compress spring 95 within the hollow 94 of the fork hub 93 and correspondingly exert pressure on the hub 93 to promote the disengagement between collar 60 and gear 50 upon reduction of the stresses therebetween with continuing travel of the vehicle. Thus actual shift of the fork 90 under the biasing action of the spring 95 from the four-wheel high position to the two-wheel high position may be delayed slightly until windup stresses which may be present in the assembly are reduced sufficiently that the spring 95 can move the fork arm 90 laterally a distance limited by the retaining ring 98 and corresponding to the new mode.

Similarly when the rod 80 in being shifted from its four-wheel low drive position to the neutral position, like stresses between gear splines 61 and collar splines 51 and between collar splines 66 and splines 68 at the rear output shaft 30 can restrain and delay movement of the extended interlocked collars 60 and 65 from the position of the four-wheel drive illustrated in FIG. 8 to the position illustrated in FIG. 7 where the splines 53 of the low speed collar 52 are disengaged from the intermediate gear splines 56. The spring 95 is compressed and is effective during such a transfer to promote the spline disengagement upon reduction of stress between the collar splines 61 and the gear splines 51. It will be recognized in view of the foregoing that the spring 95 is selected to exert sufficient force to move the fork 90 and collars of the assembly upon reduction of transfer restraining stresses, but not so large as to exert a back pressure against the spring retainer 96 to overcome the locking action imparted on the shift rod 80 by the spring 82 on the poppet ball 81 in the shift rod groove of the selected operating mode.

SECOND EMBODIMENT

The above described five gear power drive system lends itself to incorporating another shift collar system wherein two internal collars coaxial with an outer collar extend the shift capabilities without the restraints of axle torque lock or windup. FIGS. 9 to 12 show a pin-type synchronizer 125 mated in selective driving relation with a rear output gear 150 which is operated in the same manner as synchronizer 25 of FIGS. 3 to 8. The synchronizer has a locking ring 127 joined integrally with the outer circumferential periphery of a collar 160 so that upon movement of the shift rod 80, the synchronizer is activated by corresponding lateral movement of both the locking ring 127 and collar 160 to establish a driving relation with the freely rotatable rear drive gear 150.

The outer collar 160 surrounds two face-to-face aligned concentric first and second internal collars 165 and 185, respectively. The first internal collar 165 is mounted for bridging and lateral sliding relation on splines 48 of the input shaft 20 and splines 68 of the rear output shaft 30. The second internal collar 185 is mounted for bridging and lateral sliding relation on splines 68 of the rear output shaft 30 and splines 151 on the hub of a rear drive gear 150. A slug or pall 169 is mounted for vertical sliding movement within a retaining recess 177 of the first collar 165 and a locking pall 179 is mounted for vertical sliding movement within a retaining recess 187 in the second collar 185.

A compression spring 195 is provided for compression and extension between a slideable retainer 196 and a shoulder 199 on the hub of the rear output gear 150. The spring 195 in this position removes the need for the biasing spring 95 on the shaft 80 of the first embodiment in which the spring provides biasing force during shift of the rod 80 from the four-wheel high drive mode to the two-wheel high mode. FIGS. 9 to 12 illustrate in sequence the power paths and shift collar positions in the assembly for the two-wheel high, the four-wheel high, neutral and four-wheel low modes.

TWO-WHEEL HIGH MODE

Figure 9:
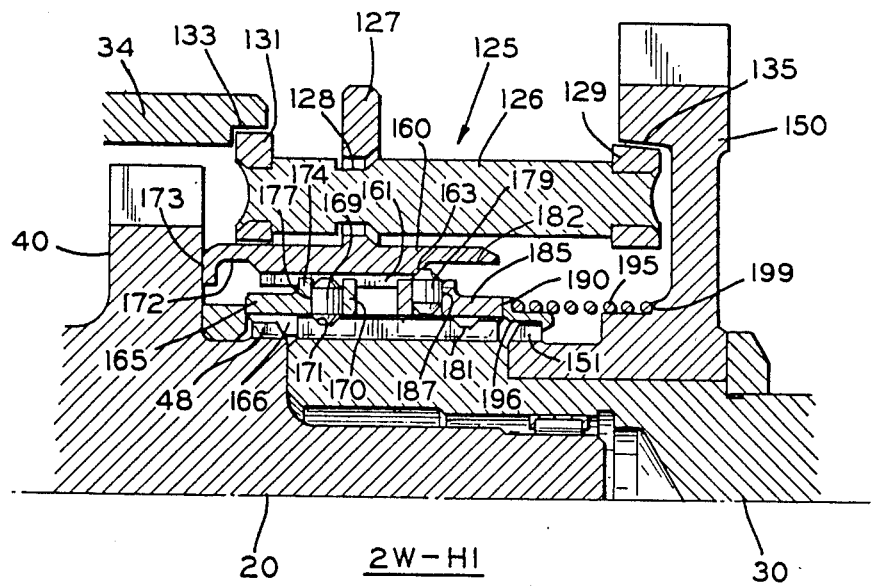
FIG. 9 is a view of part of a gear assembly like that of FIG. 3 which illustrates another embodiment of the present invention showing a modified shift collar assembly in association with the synchronizer in a setting for a two-wheel high speed drive mode for the vehicle.

FIG. 9 shows the gear assembly in its two-wheel high speed mode in which the synchronizer 125 is in inactive condition while the input drive shaft 20 is connected directly to the rear output shaft 30 by the first inner collar 165, the interior splines 166 of which establish a locked interengaging driving relation between splines 48 of the input shaft 20 and splines 68 of the output shaft 30. In this position the collar 160 is located in its extreme position in abutting relation with the input gear 40 in which it holds the pall 169 in locked position in a notch 171 in the splines 68 to hold the collar 160 locked in bridged two-wheel driving relation between the input shaft 20 and rear output shaft 30.

FOUR-WHEEL HIGH MODE

Figure 10:
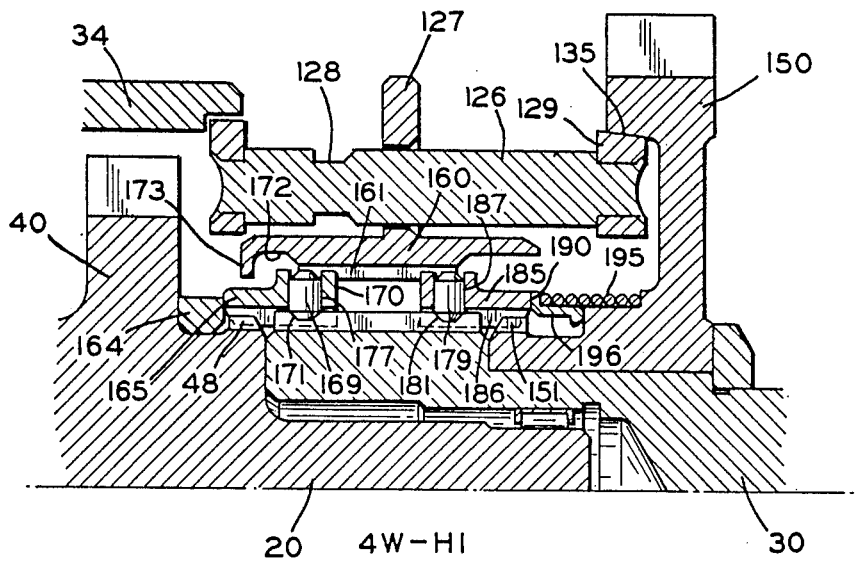
FIG. 10 is a view of the gear assembly of FIG. 9 showing the shift collar and synchronizer settings for a four-wheel high drive mode of the vehicle.

Upon shift of the gear assembly from its two-wheel high drive mode to the four-wheel high mode represented in FIG. 10, the synchronizer locking ring 127 and the integrally associated external collar 160 are moved laterally toward the rear drive gear 150 under the force of manual shift of shift rod 80. In a sequence which occurs in a time approximately one second the synchronizer 125 is activated by movement of its locking ring 127 over a portion of each of its blocking pins 126 from the grooves 128 which places the clutch ring 129 into frictional driving engagement with the rim 135 of the rear drive gear 150. The gear 150 is thereupon gradually brought up to the rotational speed of the interconnected input and rear output shafts 20 and 30, respectively. In moving the outer collar 160 laterally toward the drive gear 150 it pushes the second internal collar 185 and the spring retainer 196 laterally against the force of the compression spring 195 by engaging the top of the pall 179 held in place in its retaining recess 187. As the outer collar 160 and second internal collar 185 are advanced in unison, the inner gear splines of collar 185 engage a set of gear splines 151 on the hub of the rear drive gear 150 upon matching of the rotational speeds of the rear output gear 150 and the rear output shaft 30 by action of the synchronizer 125. The internal collar 185 is thereupon advanced further to a limit fixed by abutment of the spring retainer 196 against a hub portion of gear 150 to provide a positive driving engagement between the output rear drive gear 150 and rear output shaft 30.

The pall 179 conveyed thereby is pushed by a shoulder 163 of a larger internal diameter portion 182 of collar 160 into a locking notch or recess 181 in the splines 68 on the rear drive shaft 30 to thus lock the gear 150 in driving relation with the rear output shaft. The first internal gear 165 in the meantime is still retained in its locked position holding the input gear 40 and shaft 20 in positive driving relation since the outer collar 160 is positioned to keep the pall 169 in its locked position in the notch 171.

NEUTRAL MODE

Figure 11:
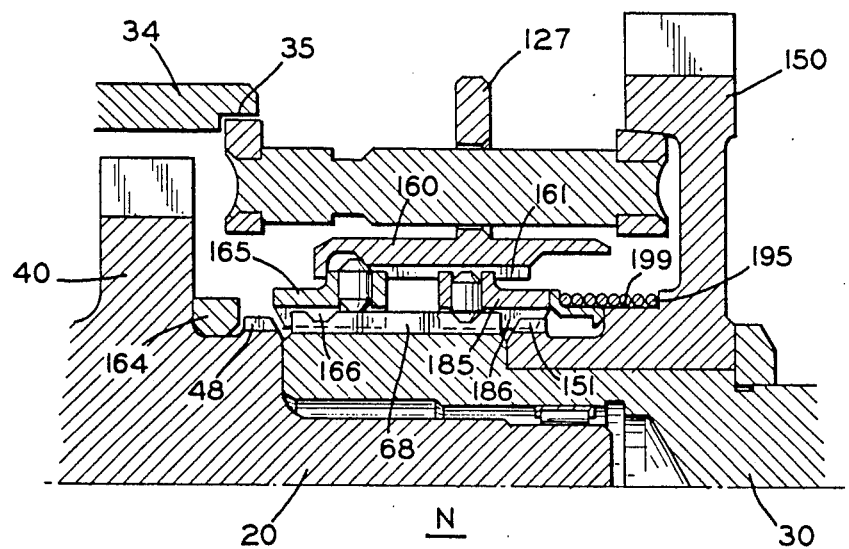
FIG. 11 is a view of the gear assembly of FIG. 9 showing the shift collar and synchronizer settings for the neutral mode of the vehicle.

Upon moving the shift rod 80 to the neutral mode of the assembly represented in FIG. 11, the synchronizer locking ring 127 with its integrally associated outer collar 160 are moved another step closer to the output gear 150 in sliding relation between splines 161 over the locked-in second internal collar 185. This causes release of the first internal collar 165 from its locked position by releasing its locking pall 169 from the notch 171 over splines 68 into an opposite recess 172 on the internal surface near the end of the collar 160. The marginal edge of the recess 172 at the end of the collar 172 is arranged to extend inwardly to a degree to provide a lip 173 for pulling engagement of an edge 174 of the retaining recess 177 so that in this step of movement the first internal collar 165 is withdrawn from its bridged relation with splines 48 on the hub of the input gear 40. Thus the rear output shaft 30 and output drive gear 150 are disconnected from input power to place the assembly in its idle neutral condition.

FOUR-WHEEL LOW MODE

Figure 12:
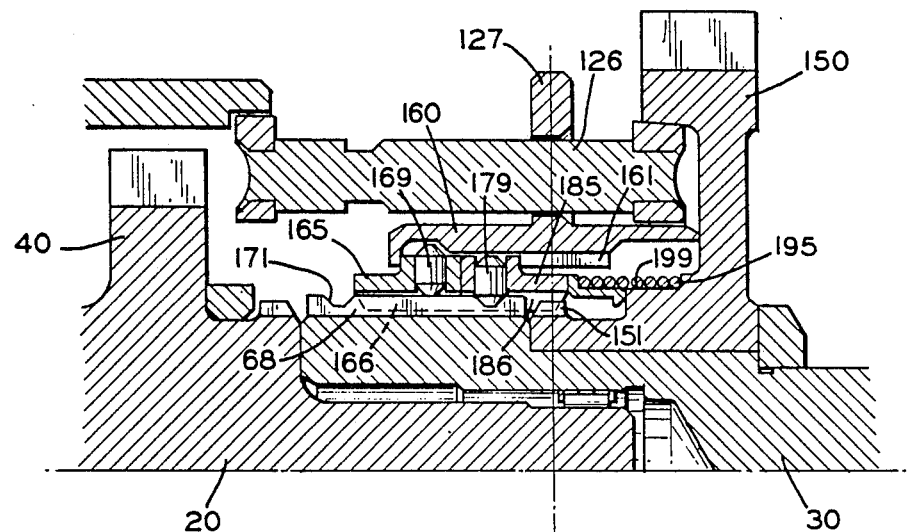
FIG. 12 is a view of the gear assembly of FIG. 9 showing the shift clutch collar and synchronizer settings for a four-wheel low drive mode of the vehicle.
Figure 12:
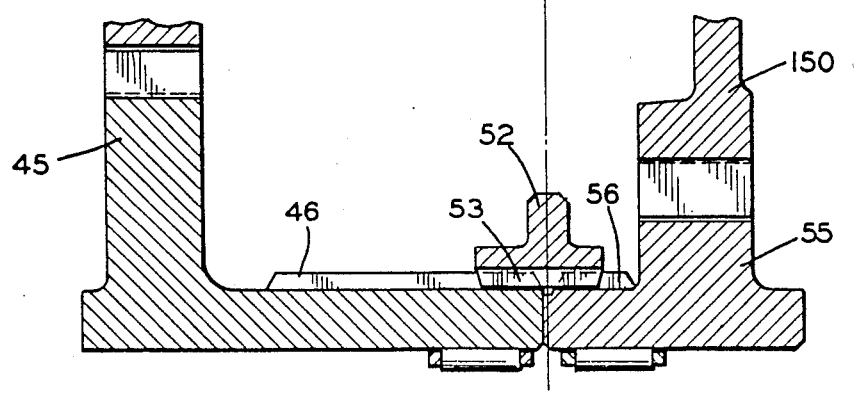

When the shift rod 80 is moved from its neutral position to the four-wheel low drive mode represented in FIG. 12, the interengaging collars 160 and 165 are advanced still further to an abutting relation of the outer collar 160 with rear output gear 150 and the first internal collar 165 abuts the second internal collar 185 while they both still maintain their intended relation with splines 161 and 68. This is accomplished while also still maintaining the interlocked relation of the rear output gear 150 with the rear output shaft 30. As the outer collar 160 is advanced, the low speed collar 52 is at the same time moved into position to bridge the splines 46 and 56 of the low speed gear 45 and intermediate gear 55, respectively, thereby resulting in these two gears rotating in unison. The torque of the input shaft 20 thus is transmitted from the input gear 40 to the low speed and intermediate gears 45 and 55 in the same manner as explained in relation to the four-wheel drive mode of the previous embodiment.

SHIFT UNDER WINDUP STRESS

As the shift rod 80 is moved into position from the two-wheel high mode illustrated in FIG. 9 to the four-wheel high, neutral and four-wheel low modes of FIGS. 10, 11 and 12, respectively, no significant restraint is presented to movement of the shift rod. In reverse, however, except for the arrangement of the invention, internal stresses of drive wheel windup would cause a restraint in movement of collars for shifts from four-wheel drive modes. More specifically, upon motion of the shift rod 80 from the four-wheel high mode of FIG. 10, to the two-wheel high mode of FIG. 9, stresses can arise between splines 151 and 186 of the rear output gear 150 and the collar 185, respectively, such that the collar 185 is restrained from lateral movement to effect its disengagement from gear 150 for shift into the two-wheel high mode illustrated in FIG. 9.

Regardless of the second internal collar 185 and the gear 150 being held locked together by such stresses, the shift rod 80 can be moved to the position of another mode because the collar 160 and the first internal coaxial collar 165 are moveable laterally independently away from collar 185. The outer collar 160 can be moved laterally to a position where it abuts the input gear 40 and the second internal collar 165 is moved to its locked position against a spacer 164. As windup stresses are reduced sufficiently with continuing travel of the vehicle, the biasing action of the compression spring 195 effects the delayed lateral movement of the internal collar 185 for its disengagement from the splines 151 of the rear drive gear 150 to place it in the two-wheel drive mode to which the shift rod 80 was moved.

In like manner any shift of the assembly such as from a four-wheel low mode to neutral or from neutral to a four-wheel high as well as the four-wheel high to the two-wheel low mode described are possible with the present embodiment independent of windup stresses because movement of the outer collar 160 upon shift of the rod 80 to one of such mode positions is independent of stresses which may exist between interengaging splines of the internal gear 185 and the rear output gear 150.

In view of the foregoing it will be recognized that this embodiment allows all shifts of the assembly without problems from torque lock. In this respect, shifting of the assembly from two-wheel drive to four-wheel drive on the fly is possible without resistance to shift which might otherwise occur due to transmitted torque. It also allows shift from the high range to neutral, then to low range with no resistance due to interaxle torque lock or windup. Further it allows shift from low range to neutral, then to high range with no resistance due to interaxle torque lock or windup. Still further, it allows shift from four-wheel drive to two-wheel drive with no resistance due to torque lock. When such shift to two-wheel drive is made, the front drive will be disconnected immediately if there is no torque lock or with a slight delay when the torque lock is relieved with further travel of the vehicle.

This embodiment further reduces concern for preselection of proper pressure springs between the shift rod and fork as in the first embodiment and also makes provision by way of the outer collar to prevent hopping of the assembly to alternate modes when in the two-wheel and four-wheel drive positions in the high speed range.

Although the drawings and description of the invention are herein presented in relation to preferred forms of the invention, it will be recognized that variations are possible within the broad scope of the invention. For example, the synchronizers in the described embodiments are associated with the rear output drive gears, but instead can be included in the assembly in association with an intermediate gear or with the front output drive gear if the latter is made free to rotate on its supporting shaft. Still further, the pilot support for the synchronizer can be of any of a number of housing supports built into the casing for the assembly.

In view of the foregoing it will be understood that many variations of the arrangement of my invention can be provided within the broad scope of the principles embodied therein. Thus while a particular preferred embodiment of my invention has been shown and described, it is intended by the appended claims to cover all such modifications which fall within the true spirit and scope of the invention.

I claim:

1. A gear assembly for selectively shifting a power driven vehicle to a two-wheel or a four-wheel drive mode comprising a case for said gear assembly, an input shaft for supply of driving power to said assembly, a first output shaft for driving a first pair of wheels and a second output shaft for driving a second pair of wheels, said input shaft and said first output shaft being arranged in abutting collinear relation with each other, a gear set comprising three constant mesh gears including a first output gear mounted for free rotation on said first output shaft, an intermediate gear in meshed relation with said first output gear and an intermediate shaft on which said intermediate gear is rotatably mounted and a second output gear for said second wheels fixed to said second output shaft and having a meshed driven relation with said intermediate gear, means for selectively connecting said input shaft in driving relation with said first output shaft to drive said first pair of wheels, a synchronizer mounted for rotation concentrically with said first output shaft and for frictional engagement with the input shaft side of said freely rotatable first output gear, means for selectively activating said synchronizer to establish such frictional engagement of the synchronizer with said first output gear to effect matching of rotational speeds between said first output gear and first output shaft, means for positive connection of said first output gear and first output shaft for rotation in unison upon such matching of speeds and shift control means for operating said means for selectively activating said synchronizer and for positive connection of said first output gear and first output shaft in said assembly corresponding to desired operating modes whereby the driving power of said input shaft can be selectively supplied to said first pair of wheels alone or to both of said pairs of wheels, said means for connecting said input shaft directly with said first output shaft comprising an annular collar having internal splines, said input shaft and first output shaft being axially aligned and having matching external splines with which the internal splines of said collar are slidably mateable whereby said collar can be selectively moved onto one of said shafts and alternately in bridging connecting relation between said shafts, said annular collar comprising an internal collar having external splines and a concentric outer collar having internal splines meshed with said external splines, said internal collar having a locking member within an aperture therein for locking said internal collar to said output shaft in its bridging relation between said shafts, said outer collar being laterally moveable over said internal collar to hold said locking member in position to effect the locked relation between said shafts, said outer collar having an interior recess for receipt of said locking member to release said locked relation between shafts when said outer collar is moved to a position with said recess over said locking member.

2. A vehicle gear assembly as set forth in claim 1 in which said selective activating means for said synchronizer comprises a ring member joined to and laterally moveable with said outer collar.

3. A vehicle gear assembly as set forth in claim 2 in which said means for positive connection of said first output gear and first output shaft comprises splines on the interior of said outer collar and matching splines on the hub of said first output gear engageable by said interior splines of said outer collar upon lateral movement thereof and the matching of speeds between said output gear and first output shaft whereby the positive connection between said first output gear and first output shaft can be established for supply of power to both pairs of wheels of the vehicle even while power is constantly applied to said first pair of wheels.

4. A gear assembly for selectively shifting a power driven vehicle to a two or four-wheel drive mode comprising a case for said gear assembly an input shaft for supply of driving power to said assembly a first output shaft for driving a first pair of wheels and a second output shaft for driving a second pair of wheels, an output gear for free rotation on said first output shaft said input shaft and said first output shaft being arranged in abutting collinear relation with each other, means for selectively connecting said input shaft in driving relation with said first output shaft to drive said first pair of wheels comprising an outer annular collar having internal splines and an internal annular collar having internal and external splines and being concentric with said internal collar, said internal collar having a locking member within an aperture therein for locking said internal collar to said output shaft in bridging relation between said output and input shafts, said outer collar being laterally moveable into a position over said internal collar to hold said locking member in place to effect the locked relation between said shafts, said outer collar having an interior recess for receipt of said locking member to release said locked relation between said shafts when said outer collar is moved to a position with said recess over said locking member, a synchronizer mounted for rotation concentrically with said first output shaft and for frictional engagement with an input shaft side of said freely rotatable output gear, said synchronizer in operation being supported on one side in engaging relation with said output gear and an internal portion of said casing providing a pilot for an opposite side of said synchronizer to minimize wobble tendencies, means for selectively activating said synchronizer to establish such frictional engagement of the synchronizer with said output gear to effect matching of rotational speeds between said output gear and first output shaft, said means for selectively activating said synchronizer comprising a ring member joined to and laterally moveable with said outer collar.

5. A gear assembly for selectively shifting a power driven vehicle to a two-wheel or a four-wheel drive mode comprising a case for said gear assembly, an input shaft for supply of driving power to said assembly, a first output shaft for driving a first pair of wheels and a second output shaft for driving a second pair of wheels, a gear set comprising three constant mesh gears including a first output gear for free rotation on said first output shaft, an intermediate gear in meshed relation with said first output gear and an intermediate shaft on which said intermediate gear is rotatably mounted and a second output gear for said second wheels fixed to said second output shaft and having a meshed driven relation with said intermediate gear, means for selectively connecting said input shaft in direct driving relation with said first output shaft to drive said first pair of wheels, said input shaft and said first output shaft being arranged in abutting collinear relation with each other, a synchronizer mounted for rotation concentrically with said first output shaft and for frictional engagement with and input shaft side of said freely rotatable first output gear, means for selectively activating said synchronizer to establish such frictional engagement of the synchronizer with said first output gear to effect matching of rotational speeds between said first output gear and first output shaft, means for positive connection of said first output gear and first output shaft for rotation in unison upon such matching of speeds and shift control means for making the selective connections and for activation of said synchronizer in said assembly corresponding to desired operating modes whereby the driving power of said input shaft can be selectively supplied to said first pair of wheels alone or to both said pairs of wheels, said means for positive connection of said first output gear and first output shaft for rotation in unison comprising a coaxial collar assembly including an internally splined outer collar and an internal power output collar on said output shaft for engagement of said first output gear, said internal power output collar having internal and external splines and being intermeshed and slideably moveable by and with said outer collar for establishment of a bridged connecting relation between said first output shaft and said first output gear.

6. A gear assembly as set forth in claim 5 in which said means for selectively connecting said input shaft in direct driving relation with said first output shaft comprises in said coaxial collar assembly an internal power input collar on said output shaft adjacent said power output collar for engagement with said input shaft, said input shaft and first output shaft being axially aligned and having matching external splines, said power input collar having internal and external splines and being intermeshed and slideably moveable by and with said outer collar for establishment of a bridged connecting relation between said matching splines on both said input shaft and said first output shaft.

7. A gear assembly as set forth in claim 6 in which each of said internal collars has a locking member retained within an aperture therein, said power output collar for connection of said first output gear and first output shaft being slideable into locked position in its bridge connecting relation between said first shaft and output gear and said other collar having a locking member to lock it into its bridge connecting relation between said input and first output shafts.

8. A gear assembly as set forth in claim 7 in which said outer collar has an internal recess providing a shoulder for pushing said internal power output collar laterally by way of its locking member into bridged connecting relation between said first output gear and first output shaft following activation of said synchronizer and matching of speeds between said first output gear and first output shaft, splines of said first output shaft having a recess for receipt of the locking member of said internal power output collar upon lateral movement thereof toward said output gear and at the same time causing its disengagement from said shoulder and retention in such locked position by said outer collar.

9. A gear assembly as set forth in claim 6 in which said power output collar for connecting said first output gear and said first output shaft includes a power output locking member within an aperture therein and an output locking notch in said output shaft for engagement by said output locking member to lock said power output collar to said output shaft, said outer collar being laterally moveable over said internal output collar to hold said output locking member in position in said output locking notch to maintain a locked relation between said first output gear and said first output shaft, said outer collar having an interior recess for receipt of said output locking member to release said locked relation between said first output gear and shaft when said outer collar is moved to a position with said recess over said power output locking member.

10. A gear assembly as set forth in claim 9 in which said power input collar for connecting said input shaft in direct driving relation with said first output shaft includes a power input locking member within an aperture therein and an input locking notch in said output shaft for engagement by said input locking member to lock said power input collar to said first output shaft, said outer collar being laterally moveable over said internal input collar to hold said input locking member in position in said input locking notch to maintain a locked relation between said power input and power output shafts, said outer collar having a second interior recess for receipt of said input locking member to release said locked relation between said power input and power output shafts when said outer collar is moved to a position with said second recess over said power input locking member.

11. A gear assembly as set forth in claim 5 wherein said synchronizer is mounted for rotation with said first output gear and including a second gear set comprising two constant mesh gears one of which is an input gear fixed on and rotated with said input shaft and the other being a low speed gear in constant mesh with and larger in diameter than said input gear, said low speed gear being freely rotatable on said intermediate shaft, means for selectively connecting said low speed gear for rotation in unison with the intermediate gear of said three gear set whereby power is supplied to said three gear set at a lower rotational speed than the rotational speed of said input shaft, said synchronizer being supported in said assembly between said gear sets, a single shift fork between said gear sets for activating said synchronizer and for changing connections between said gears and shafts and a manual shift control rod for changing position of said fork to effect changes in connections between said gears and shafts through said assembly corresponding to operating modes of said assembly selected by the positioning of said control rod, said means for positive connection of said first output gear and said first output shaft on which it is mounted and said means for connecting said input shaft with said first output shaft comprising in said coaxial collar assembly a pair of internal collars aligned in end-to-end relation and coaxially with an outer collar moveable laterally with respect to each other in extended relation in interengaging association with said outer collar.

12. A gear assembly as set forth in claim 11 wherein said means for connecting said low speed gear for rotation with the intermediate gear is a separate collar moveable in unison with the outer collar of said coaxial collar assembly.

13. A gear assembly for selectively shifting a power driven vehicle to a two-wheel or a four-wheel drive mode comprising a case for said gear assembly, an input shaft for supply of driving power to said assembly, a first output shaft for driving a first pair of wheels and a second output shaft for driving a second pair of wheels, a gear set comprising three constant mesh gears including a first output gear for free rotation on said first output shaft, an intermediate gear in meshed relation with said first output gear and an intermediate shaft on which said intermediate gear is rotatably mounted and a second output gear for said second wheels fixed to said second output shaft and having a meshed driven relation with said intermediate gear, means for selectively connecting said input shaft/in driving relation with said first output shaft to drive said first pair of wheels, said input shaft and said first output shaft being arranged in abutting collinear relation with each other, a synchronizer mounted for direct rotation concentrically with said first output shaft and for frictional engagement with the input shaft side of said freely rotatable first output gear, means for selectively activating said synchronizer to establish such frictional engagement of the synchronizer with said first output gear to effect matching of rotational speeds between said first output gear and first output shaft, means for positive connection of said first output gear and first output shaft for rotation in unison upon such matching of speeds and shift control means for operating said means for selectively connecting said input and first output shafts and said means for selectively activating said synchronizer in said assembly corresponding to desired operating modes whereby the driving power of said input shaft can be selectively supplied to said first pair of wheels alone or to both said pairs of wheels, said means for positive connection of said first output gear and first output shaft for rotation in unison comprising a coaxial collar assembly including an internally splined outer collar and an internal power output collar on said output shaft for engagement of said output gear, said internal power output collar having internal and external splines and being intermeshed and slideably moveable by and with said outer collar for establishment of a bridged connecting relation between said first output shaft and said first output gear, said means for selectively connecting said input shaft in driving relation with said first output shaft comprising in said coaxial collar assembly an internal power input collar on said output shaft adjacent said power output collar for engagement with said input shaft, said input shaft and first output shaft being axially aligned and having matching external splines, said power input collar having internal and external splines and being intermeshed and slideably moveable by and with said outer collar for establishment of a bridged connecting relation between said matching splines on both said input shaft and said first output shaft, said power output collar for connecting said first output gear and said first output shaft including a power output locking member within an aperture therein and an output locking notch in said output shaft for engagement by said output locking member to lock said power output collar to said output shaft, said outer collar being laterally moveable over said internal output collar to hold said output locking member in position in said output locking notch to maintain a locked relation between said first output gear and said first output shaft, said outer collar having an interior recess for receipt of said output locking member to release said locked relation between said first output gear and shaft when said outer collar is moved to a position with said recess over said power output locking member, said power input collar for connecting said input shaft in driving relation with said first output shaft including a power input locking member within an aperture therein and an input locking notch in said output shaft for engagement by said input locking member to lock said power input collar to said first output shaft, said outer collar being laterally moveable over said internal input collar to hold said input locking member in position in said input locking notch to maintain a locked relation between said power input and power output shafts, said outer collar having a second interior recess for receipt of said input locking member to release said locked relation between said power input and power output shafts when said outer collar is moved to a position with said second recess over said power input locking member, a compression spring provided between said first output gear and said internal power output collar to effect disengagement of said internal output collar from its bridged relation between said first output shaft upon shift of said assembly from a driving connection with said first output gear and release of interlocking stresses which may exist between splines of said first output gear and said power input collar.

14. A gear assembly as set forth in claim 13 in which said selective activating means for said synchronizer comprises a ring member joined to and laterally moveable with said outer collar and said shift control means comprises a single fork for making the selective connections.

* * * * *